(12) United States Patent
Levin et al.

(10) Patent No.: US 7,248,794 B2
(45) Date of Patent: Jul. 24, 2007

(54) REMOTE PLATFORM MULTIPLE CAPTURE IMAGE FORMATION METHOD AND APPARATUS

(75) Inventors: Vola Levin, Tel Aviv (IL); Yakov Hoch, HaNegev (IL)

(73) Assignee: ImageSat International N.V., Limassol (CY)

( * ) Notice: Subject to any disclaimer, the term of this patent is extended or adjusted under 35 U.S.C. 154(b) by 825 days.

(21) Appl. No.: 10/685,384

(22) Filed: Oct. 16, 2003

(65) Prior Publication Data
US 2004/0252881 A1 Dec. 16, 2004

Related U.S. Application Data

(60) Provisional application No. 60/477,783, filed on Jun. 12, 2003.

(51) Int. Cl.
*G03B 35/02* (2006.01)
*G03B 39/00* (2006.01)
*H04N 7/18* (2006.01)
*H04N 13/02* (2006.01)
*G06K 9/36* (2006.01)

(52) U.S. Cl. .............................. 396/7; 396/329; 348/50; 348/144; 348/218.1; 382/284

(58) Field of Classification Search ................... 396/7, 396/12, 322, 324, 329; 348/50, 144, 147, 348/218.1; 382/284
See application file for complete search history.

(56) References Cited

U.S. PATENT DOCUMENTS

| 3,527,880 | A | * | 9/1970 | Gordon | 348/50 |
| 4,613,899 | A | * | 9/1986 | Kuwano et al. | 348/50 |
| 5,027,199 | A | * | 6/1991 | Suzuki | 348/50 |
| 5,138,444 | A | * | 8/1992 | Hiramatsu | 348/50 |
| 5,251,037 | A | * | 10/1993 | Busenberg | 348/147 |
| 5,353,055 | A | * | 10/1994 | Hiramatsu | 348/145 |
| 6,747,686 | B1 | * | 6/2004 | Bennett | 348/145 |

* cited by examiner

Primary Examiner—W. B. Perkey

(57) ABSTRACT

A method of controlling a remote imaging platform for image acquisition of an imaging target, the method comprises: controlling said platform to aim a camera at said target, and controlling said platform to take at least a first, a second and a third images of said target during the course of a single pass of said platform over said target, whilst keeping said camera locked onto said target for a duration required to take said images. Applications include forming a stereo pair from said first and said third image to obtain topographical data of said target, and applying said topographical data from said stereo pair to the second image, the second image being a high resolution image taken from above the target, the result being a nadir image with topographical data. Another application is to form several stereo images and combine them into an overall image containing enhanced topographical information. Another application is to combine pixels from multiple images of the target onto a single grid to provide enhanced resolution.

29 Claims, 14 Drawing Sheets

REMOTE PLATFORM MULTIPLE CAPTURE IMAGE FORMATION METHOD AND APPARATUS

RELATIONSHIP TO EXISTING APPLICATIONS

The present application claims priority from U.S. Provisional Patent Application Ser. No. 60/477,783 filed Jun. 12, 2003, the contents of which are hereby incorporated by reference.

FIELD AND BACKGROUND OF THE INVENTION

The present invention relates to a remote platform multiple capture image formation method and apparatus and, more particularly, but not exclusively to such a system wherein the remote platforms are orbital satellites.

Imaging of the earth's surface from high flying aircraft or from orbital satellites is routinely carried out and is useful for obtaining information for numerous monitoring applications, both civil and military. As the satellite imaging data gets more and more detailed it contains more information and thus allows more and more uses. It is therefore a widely recognized aim to obtain higher resolutions and find processing methods in order to obtain more data from the resolutions available.

One way of increasing the amount of data is to take two images of the same target from different angles. The two images can then be combined into a single stereo image containing height information. In order to obtain the two images from which to form the stereo combination it is usual to have two different cameras spaced apart by a certain difference, and angled to view the same scene. The use of stereo imaging is quite common in satellite photography for application in which surface topography is of importance.

Another way of increasing the amount of data from the imaging process involves mounting on the satellite imaging platform two cameras, one camera being a high-resolution black and white camera and the second camera being a lower resolution color camera. The black and white camera obtains a high-resolution pixel scan, to which color is added from the color camera. A disadvantage of the method is that the two cameras are different cameras producing different images at different resolutions and thus there is not a one-to-one correspondence to allow colors to be applied to the high-resolution pixels.

The use of two cameras is in any case a disadvantage because of increased cost and complexity, and an orbital satellite is not an environment where it is easy to organize repairs. It is therefore desirable to find a method of increasing the data available but using only a single camera.

Satellites are further able to take multiple images of the same target in successive passes. Again the images can be combined. However the time interval between the two passes makes it highly likely that there are significant changes between the two images, in lighting, in cloud cover, in the exact positions from which the two images are taken etc. so that combining the images is not a trivial task.

There is thus a widely recognized need for, and it would be highly advantageous to have, a vehicle inspection system devoid of the above limitations.

SUMMARY OF THE INVENTION

According to one aspect of the present invention there is provided a method of controlling a remote imaging platform for image acquisition of an imaging target, the method comprising:

controlling the platform to aim a camera at the target, controlling the platform to take at least a first, a second and a third images of the target during the course of a single pass of the platform over the target, whilst keeping the camera locked onto the target for a duration required to take the images.

The method may comprise combining the first, second and third images to form an overall imaging output of the target.

Preferably, the combining comprises pixel wise mapping between the images.

The method may comprise forming an overall pixel grid comprising pixels from each of the images, thereby to form an overall output being of higher resolution than each of the images.

Preferably, the overall output comprises a comparison between the images to detect movement between the images.

Preferably, the controlling comprises taking at least four images of the target and the combining comprises forming at least two stereo images of the target.

Preferably, the combining further comprises combining at least two of the stereo images using pixelwise mapping, thereby to incorporate, into the overall output, altitude information from each of the at least two stereo images.

The method may comprise angling the camera with respect to a direction of approach to the target prior to taking of any one of the images, thereby to increase resolution by hypersampling of the target.

Preferably, the controlling comprises:

controlling the platform to take the first image prior to passing overhead, controlling the platform to take the second image whilst substantially at nadir with respect to the target, and controlling the platform to take the third image subsequently to passing overhead, the method further comprising:

forming a stereo pair from the first and the third image to obtain topographical data of the target, and;

applying the topographical data from the stereo pair to the second image to obtain a nadir image with topographical data.

Preferably, the applying the topographical data from the stereo pair to the second image comprises applying a mapping between pixels of the stereo pair and pixels of the second image.

The method may comprise obtaining at least a first additional image prior to passing overhead, and at least a second additional image after passing overhead, and combining the additional images to form at least one additional stereo pair.

The method may comprise applying topographical data of the additional stereo pair to the second image already having topographical data of the first stereo pair.

The method may comprise angling the camera with respect to a direction of approach to the target prior to taking of the second image, thereby to increase resolution of the second image by hypersampling of the target.

Preferably, the hypersampling comprises:

receiving oblique angle oversampled scanned data, and rearranging the oblique angle oversampled scan data into regularly arranged pixels, thereby to form a regular image.

Preferably, the oblique angle has a tangent of at least one.

Preferably, the oblique angle is an angle having an integer tangent.

Preferably, the rearranging comprises geometrically carrying out one-to-one mapping of sample pixels from the oblique overscanning, onto an image pixel grid representative of an actual geometry of a scanned object, thereby to form the regular image.

Preferably, the rearranging further comprises interpolating between the oblique angle oversampled data to fill pixel positions of an image pixel grid representative of an actual geometry of a scanned object, the pixel positions being intermediate between sampled pixel positions, thereby to form an improved precision image.

The method may comprise deconvoluting the oblique angle oversampled scanned data to compensate for optical distortion incurred in scanning.

Preferably, the deconvoluting comprises compensating for distortions introduced by the oblique angle oversampling.

Preferably, the deconvoluting comprises compensating for distortions introduced by the oblique angle oversampling and by optical distortion within the scanner.

Preferably, the platform is mounted on an orbiting satellite.

According to a second aspect of the present invention there is provided a method of controlling an orbital satellite for imaging, the satellite comprising a camera, the method comprising:

downloading to the satellite control software, the control software being operable with a selected imaging target to control the camera to:

aim at the target, obtain at least three images of the target over the duration of a single pass, form an overall image output comprising data from the images.

Preferably, the forming an overall image comprises:

carrying out image processing to form at least a fourth image being a stereo pair combined from two of the images.

The method may comprise forming at least a fifth image being a second stereo pair and combining the stereo pairs to form the overall output such that the overall output comprises altitude information from a plurality of stereo pairs.

Preferably, the forming an overall image comprises:

forming a fourth image, being a stereo pair, from the first and the third images, and mapping topographical data from the fourth image onto the second image to form a nadir image having topographical data.

According to a third aspect of the present invention, there is provided apparatus for photograph formation from multiple image capture, at a remote platform approaching and passing over a target, comprising:

camera direction controllability for training the camera on the target, image taking controllability for controlling the camera to image the target at least three times over the target, at any requested one of approach to the target, at nadir and after passing the target, image processing functionality for forming a stereo image by combining an image taken upon approach with an image taken after passing the target, thereby to obtain topographical data of the target, and additional image processing functionality for mapping the topographical data onto an image formed at the nadir, thereby to form a nadir image having topographical data.

According to a fourth aspect of the present invention, there is provided apparatus for photograph formation from multiple image capture, at a remote platform approaching and passing over a target, comprising:

camera direction controllability for training the camera on the target, image taking controllability for controlling the camera to image the target at least three times over a single pass over the target, at any requested one of approach to the target, at nadir and after passing the target, image processing functionality for combining the images into a single overall output.

According to a fifth aspect of the present invention, there is provided apparatus for photograph formation from multiple image capture, at a remote platform approaching and passing over a target, comprising:

camera direction controllability for training the camera on the target, image taking controllability for controlling the camera to image the target at least once upon approach to the target, at nadir and at least once after passing the target, image processing functionality for forming a stereo image by combining an image taken upon approach with an image taken after passing the target, thereby to obtain topographical data of the target, and additional image processing functionality for mapping the topographical data onto an image formed at the nadir, thereby to form a nadir image having topographical data.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps such as scanning manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
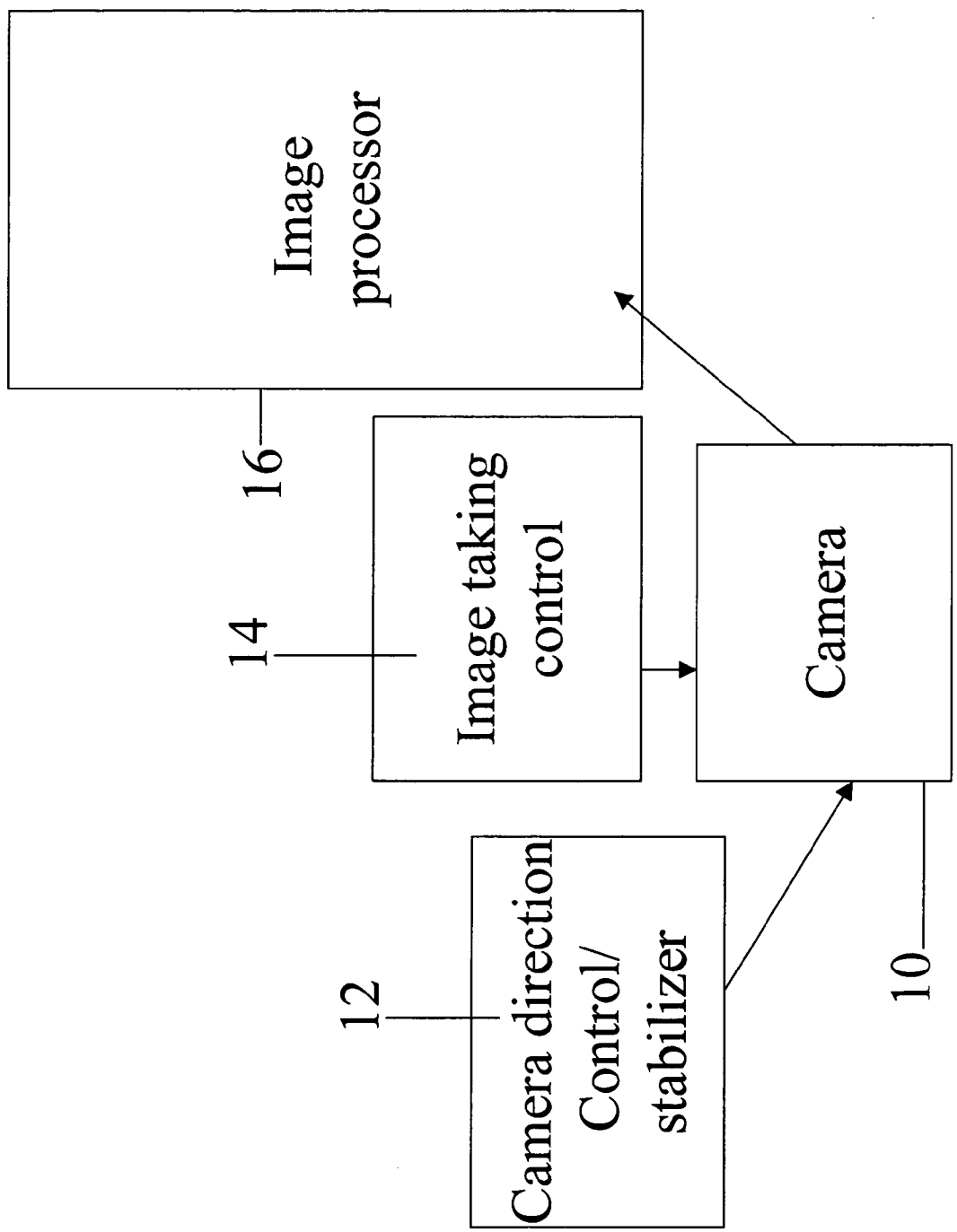
FIG. 1 is a simplified block diagram illustrating apparatus for taking multiple image captures in a single pass over a target and combining the images using image processing, according to a first preferred embodiment of the present invention.

Maneuverable remote sensing scanning platforms, such as some observation satellites, are now agile enough to be able to control a single camera to image the same location multiple times in close succession, that is to say in a single pass over the target location. Appropriate imaging strategies are applied to process such multiple images to form overall results from the multiple images that are useful for various mapping and analysis applications.

In one application, the present embodiments comprise a mapping strategy in which topographical data from a stereo pair of images is combined, by mapping, with a high resolution nadir image. In a preferred embodiment the nadir image is obtained by resolution-enhancing hypersampling.

In another embodiment, enhanced altitude information is obtained by combining two or more stereo images obtained on a single pass over a target.

In another embodiment, a high resolution overall image is produced by taking several images and combining pixels from each of the images onto a single high resolution grid.

In another embodiment, movement around the target is studied by comparing successive images taken in quick succession.

The principles and operation of a multiple imaging system and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which illustrates a simplified apparatus for capturing multiple images from a target and forming an overall result by combining data from the image capture. The apparatus comprises a camera 10, typically a digital camera using a pixel based image capture device rather than film. The camera may be a conventional optical camera or may incorporate an image intensifier or may use infra-red or other wavelengths in the electromagnetic spectrum as dictated by the application. The camera 10 is controlled for direction by camera direction control 12, which is preferably also able to compensate for motion of the platform on which the camera is mounted and keep the camera trained on a given target for enough time to make multiple image captures, typically between ten and sixty seconds. Preferably, the camera is also connected to image taking control 14 which tells the camera when to integrate an image. The output of the camera is then sent to image processor 16. In one embodiment the image processor is co-located with the camera on the platform, but in other embodiments the image processor may be located at processing facilities on the ground. The camera 10 together with the camera control units 12 and 14, are typically mounted on an aircraft or a satellite.

In use the camera is locked onto a target upon approach by the direction control 12. The camera takes multiple images of the target, including during approach, whilst above the target and when receding. Each image increases the information available about the target. The images may be combined in various ways by the image processor to produce an overall output which is suitable for the end user's particular application. For example it is possible to combine the individual images in such a way as to improve resolution, or it is possible to combine data in such a way as to add topographical information to an overhead view.

In order to explain how the above-described apparatus may be useful, an application is discussed in which an overall result is produced that combines high x-y resolution with altitude information.

Figure 2:
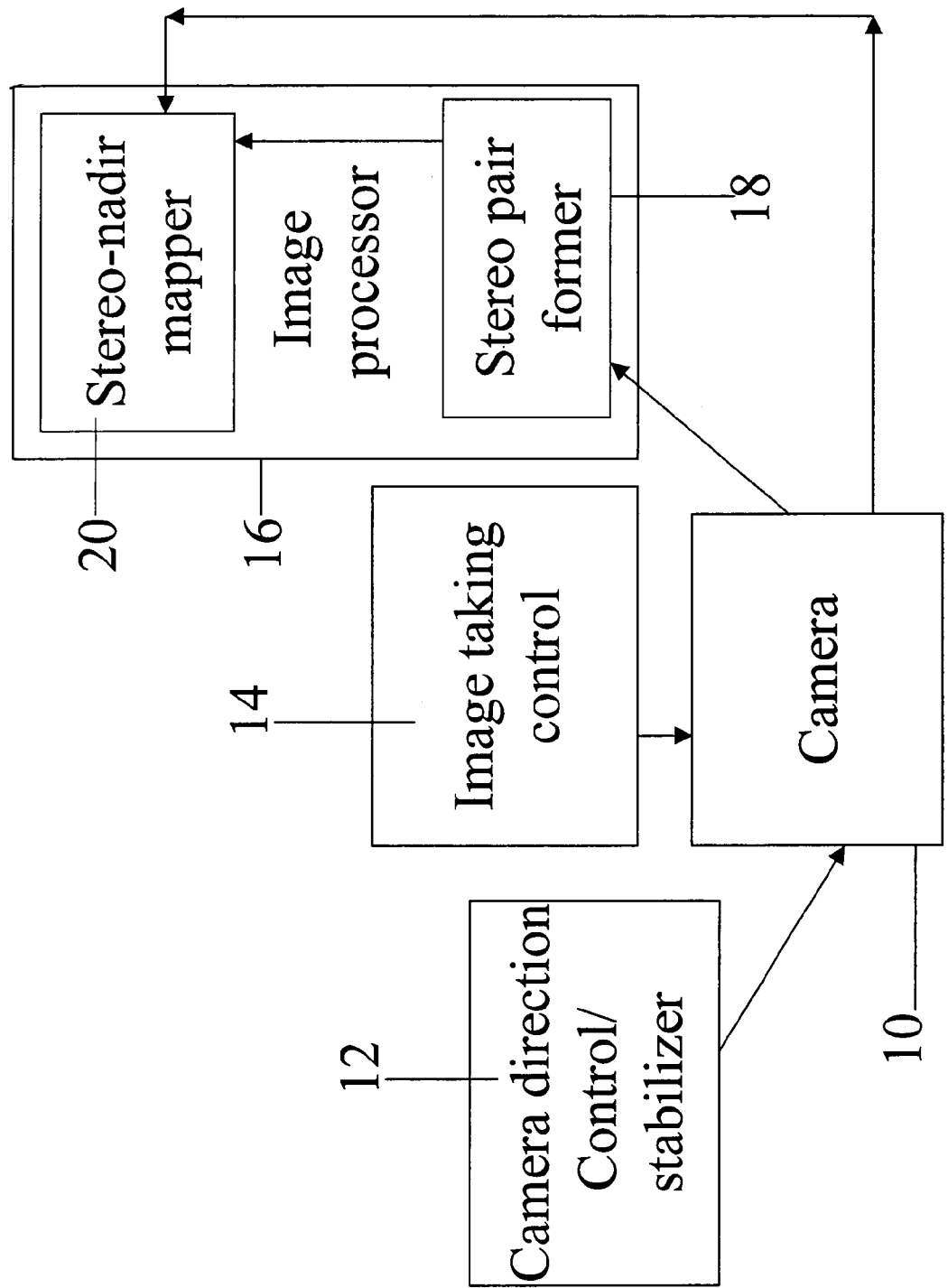
FIG. 2 is a simplified block diagram showing apparatus for taking multiple image captures and combining them into a single overall output giving both high resolution and altitude information, according to a preferred embodiment of the present invention.

Reference is now made to FIG. 2, which is a simplified diagram illustrating how the apparatus of FIG. 1 may be configured to provide an embodiment in which topographical information may be added to an overhead view. Parts that are the same as in previous figures are given the same reference numerals and are not referred to again except as necessary for understanding the present embodiment. The image processor 16 is configured to provide a stereo image former 18 and a stereo-nadir image combiner 20.

In the embodiment of FIG. 2, the camera is controlled by image taking control 14 to take one or more images upon approach to the target. The camera is then controlled to take one image, the nadir image, whilst over the target, and then to take one or more images after passing the target. The image captures are output to the image processor 16.

Following image capture, the stereo pair former 18 selects two suitable images captured by the camera of the target, each at a different angle, and forms a stereo image therefrom. The stereo image utilizes the differences between the two original images to obtain altitude information. Typically the two images are one taken on approach to the target, and the second at an equivalent angle after passing the target.

The stereo output of the stereo former 18 is fed to stereo-nadir combiner 20. The combiner 20 obtains a high resolution image of the target from the camera 10, typically the highest resolution available is that taken when the camera is directly overhead, that is the nadir image. The combiner uses the high resolution image as the basic image and uses a pixel to pixel mapping to apply to the nadir image the altitude information from the stereo image. The overall output, from the combiner, is thus the nadir image bearing the highest available resolution and also altitude information.

In order to improve the resolution of the nadir image it is possible to tilt the camera so that the rows of pixels in the camera sensor are at an oblique angle to the direction of the target scanning of the platform. In addition, appropriate processing of the image is required, as described in the present Assignee's co-pending U.S. Pat. application No. 10,450,535 filed May 1, 2003, the contents of which are hereby incorporated by reference. As will be explained hereinbelow, such an approach allows what is known as hypersampling and produces an improved resolution image.

In order to improve the altitude information it is possible to generate more than one stereo pair. The more stereo pairs are involved, the more accurate will be the altitude information in the final result.

The process of multiple imaging is highly dependant on the specific properties of the remote sensing platform. The two properties that factor in the most are the maneuvering ability and the sensor's sensitivity. These two factors together with the attributes of the imaged location determine how many images of the same location can be taken in a specific timeframe. Thus the procedure outlined herein does not work for all imaging satellites and does not work for all targets.

Figure 3:
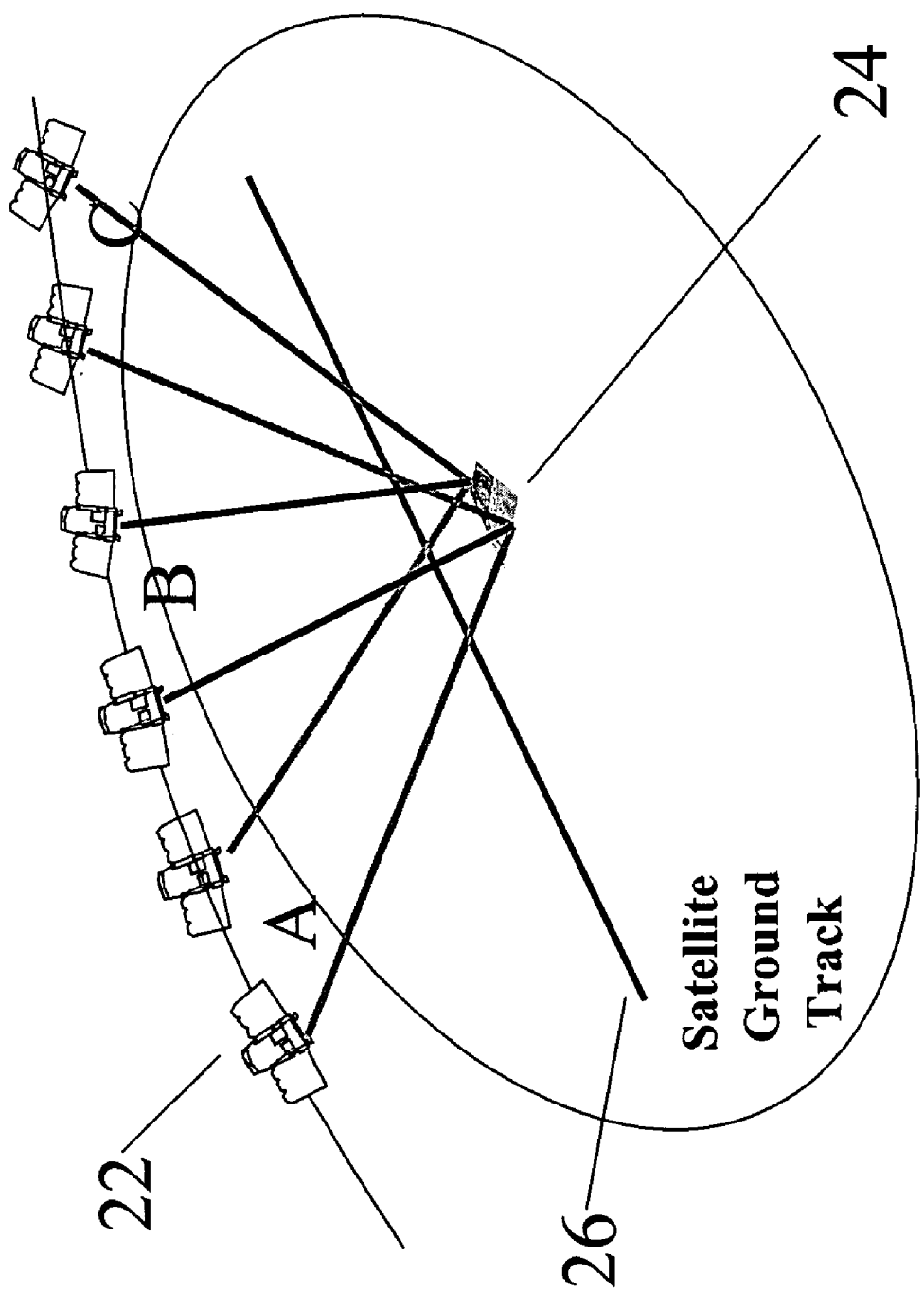
FIG. 3 is a simplified schematic diagram showing a satellite in three successive image capture positions over a target according to a preferred embodiment of the present invention.

Reference is now made to FIG. 3, which is a simplified diagram illustrating a satellite 22 taking three successive image captures, at positions A, B and C, to form a multiple capture overall image of a target 24. The satellite travel direction is indicated by arrow 25. Line 26 illustrates the ground track of satellite 22. It is noted that the ground track does not pass exactly over the target so that the nadir position is not directly over the over the target but inclined towards the side. Position A is on the approach of the satellite to the target. Position B is at the steepest angle of the satellite above the target and gives the highest resolution view of the target. Position C is beyond the target, as the satellite moves away therefrom. Positions A and C are at similar angles and thus are suitable for selection as a stereo pair.

A set of three images from a single pass, two taken as a stereo pair at oblique angles and one taken close to the nadir, as explained hereinabove, gives results which, compared to other means of achieving similar results, provide high relative positional accuracy and a high degree of similarity between the images.

Figure 4:
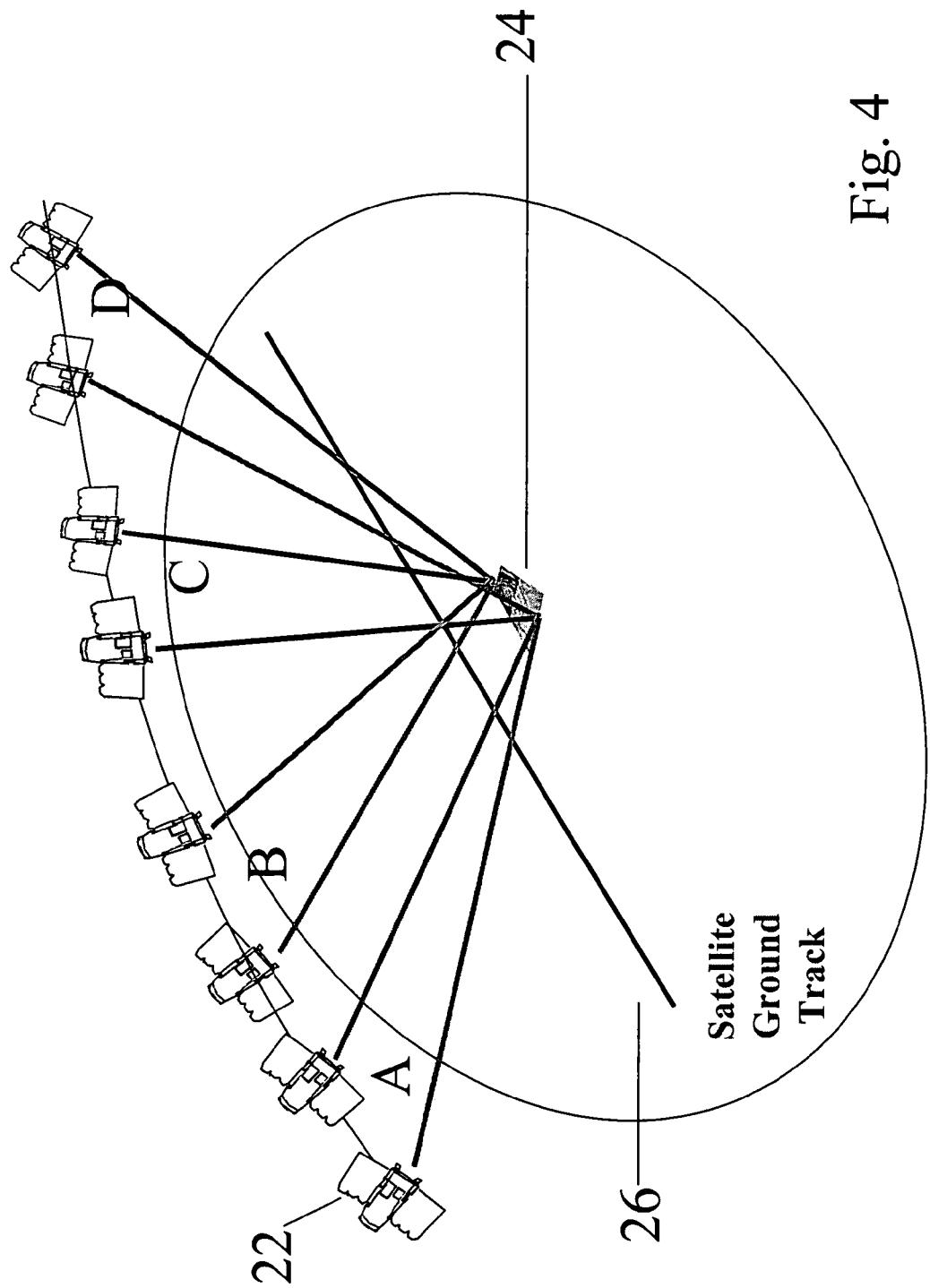
FIG. 4 is a simplified schematic diagram illustrating a satellite in four successive image capture positions over a target according to a preferred embodiment of the present invention.

Reference is now made to FIG. 4, which is a simplified schematic diagram illustrating a satellite in four successive image capture positions as it passes over a target, according to a further preferred embodiment of the present invention. Parts that are the same as in previous figures are given the same reference numerals and are not referred to again except as necessary for understanding the present embodiment. Satellite 22 passes over a target 24, following ground track 26.

Four images are taken at positions A, B, C, and D and the images may be paired in any way desired to form stereo pairs. For example A may be paired with C and B with D, or A may be paired with D and B with C. The process can be extended to five, six or even more images, depending on the limitations of the target, of the satellite's ability to maneuver the camera 10 and of the camera's sensitivity. Each of the stereo images contains slightly different altitude information and, as will be explained below, the stereo images can be combined into a single overall image containing enhanced altitude information.

Figure 5:
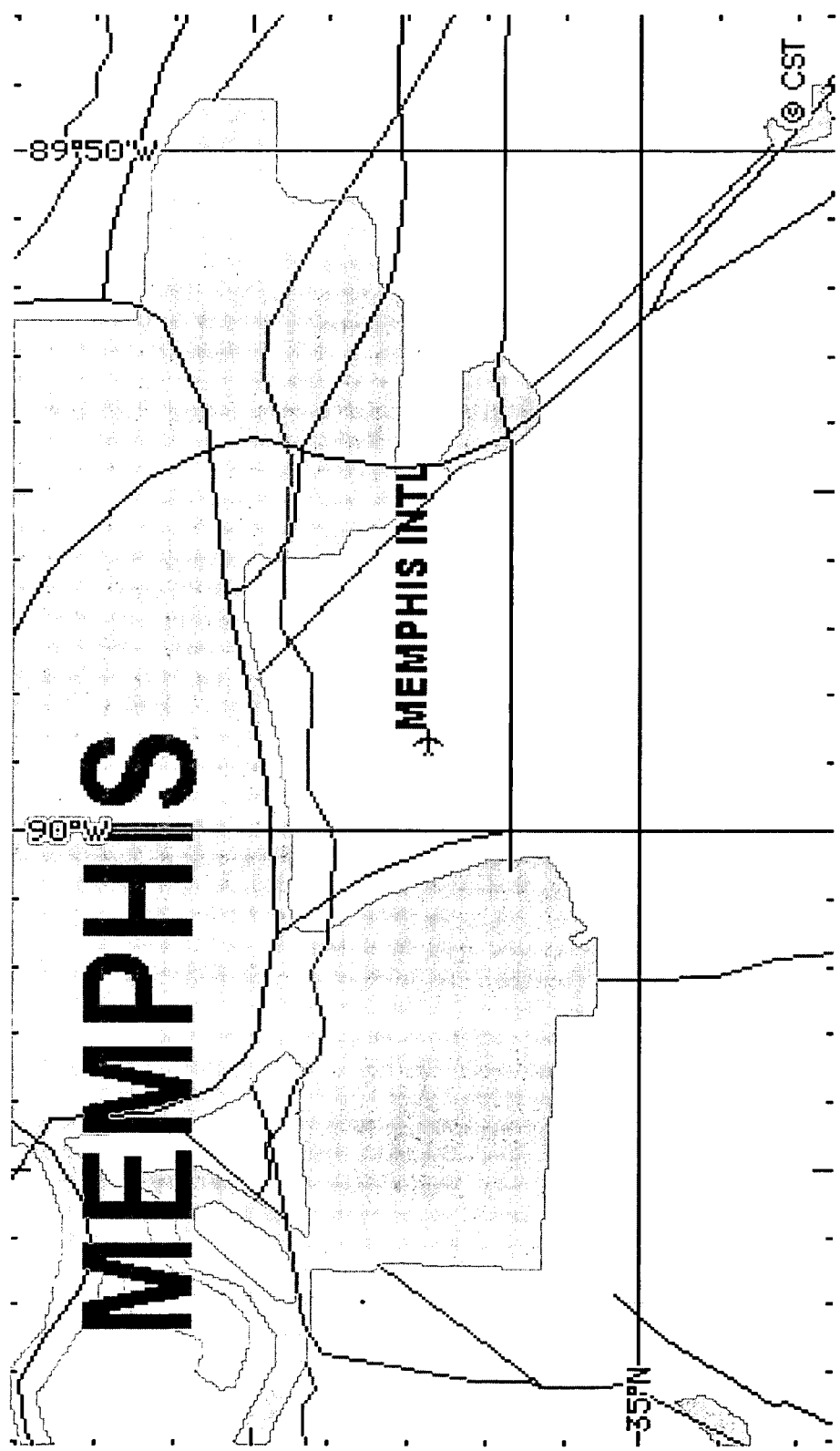
FIG. 5 is a map of the surroundings of the International airport at Memphis Tenn.
Figures 6A, 6B, 6C:
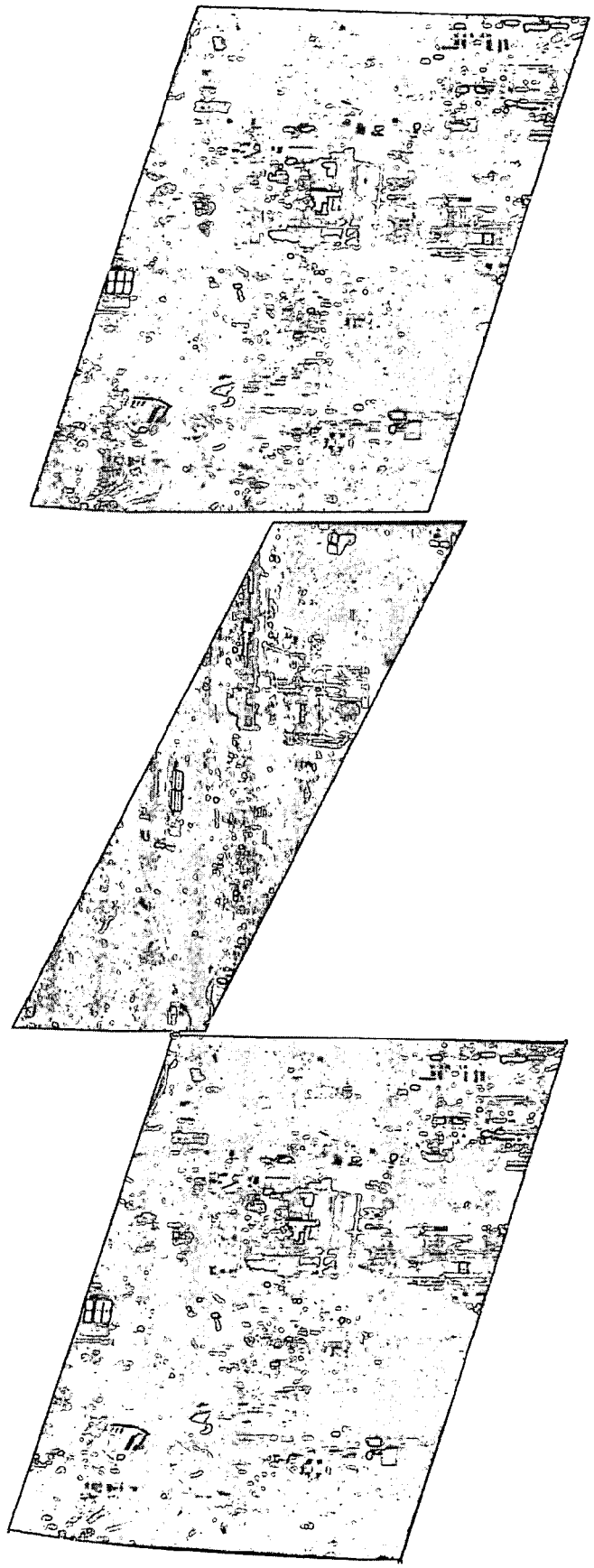
FIGS. 6A to 6C are a set of three satellite images of the region shown in FIG. 5 taken according to the embodiment shown in FIG. 3.
Figure 6A:
Figure 6B:
Figure 6C:

Reference is now made to FIG. 5, which is a map of an imaging target. Specifically the map shows Memphis Tenn., and a region centered by Memphis International Airport. FIG. 6 illustrates three image captures, A, B, and C, centered on the airport and taken in accordance with the embodiment of FIG. 3. Image captures A and C are taken at similar angles and are thus suitable for pairing to form a stereo image, and B is the nadir image containing the highest possible resolution. It is pointed out that the images of FIG. 6 are reduced by two orders of magnitude for the purpose of reproduction in this document, and thus do not reflect the resolution available. FIG. 6 shows the three image captures together. FIGS. 6A, 6B and 6C show the three image captures slightly larger but still not approaching the true resolution.

Figure 7:
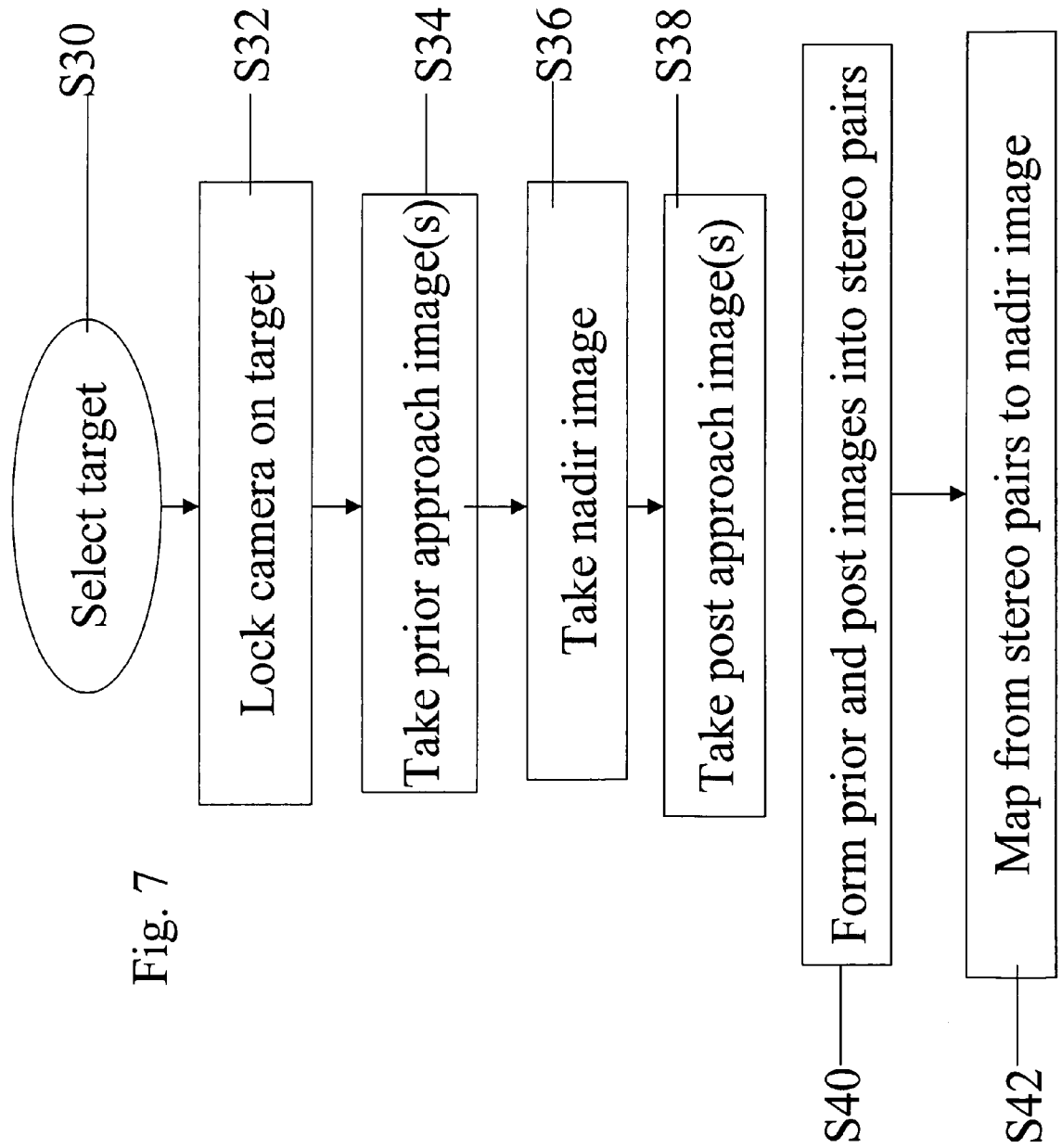
FIG. 7 is a simplified flow chart illustrating the procedure for obtaining an image by combining stereo and high resolution images according to the embodiment of FIG. 3.

Reference is now made to FIG. 7, which is a simplified flow chart illustrating the procedure of obtaining the images of FIG. 6 and combining them into a single combined output. In a stage S30 a target is selected. In a stage S32 the camera is locked onto the target as the target is approached. In a step S34 one or more image captures are made of the target as it is approached. In a step S36 a nadir image is taken and at step S38 one or more images are taken as the satellite recedes from the target. In step S40 the prior and post images are formed into stereo pairs so that altitude information becomes available and in step 42 the altitude information from the stereo pairs is mapped onto the nadir image.

Figure 8:
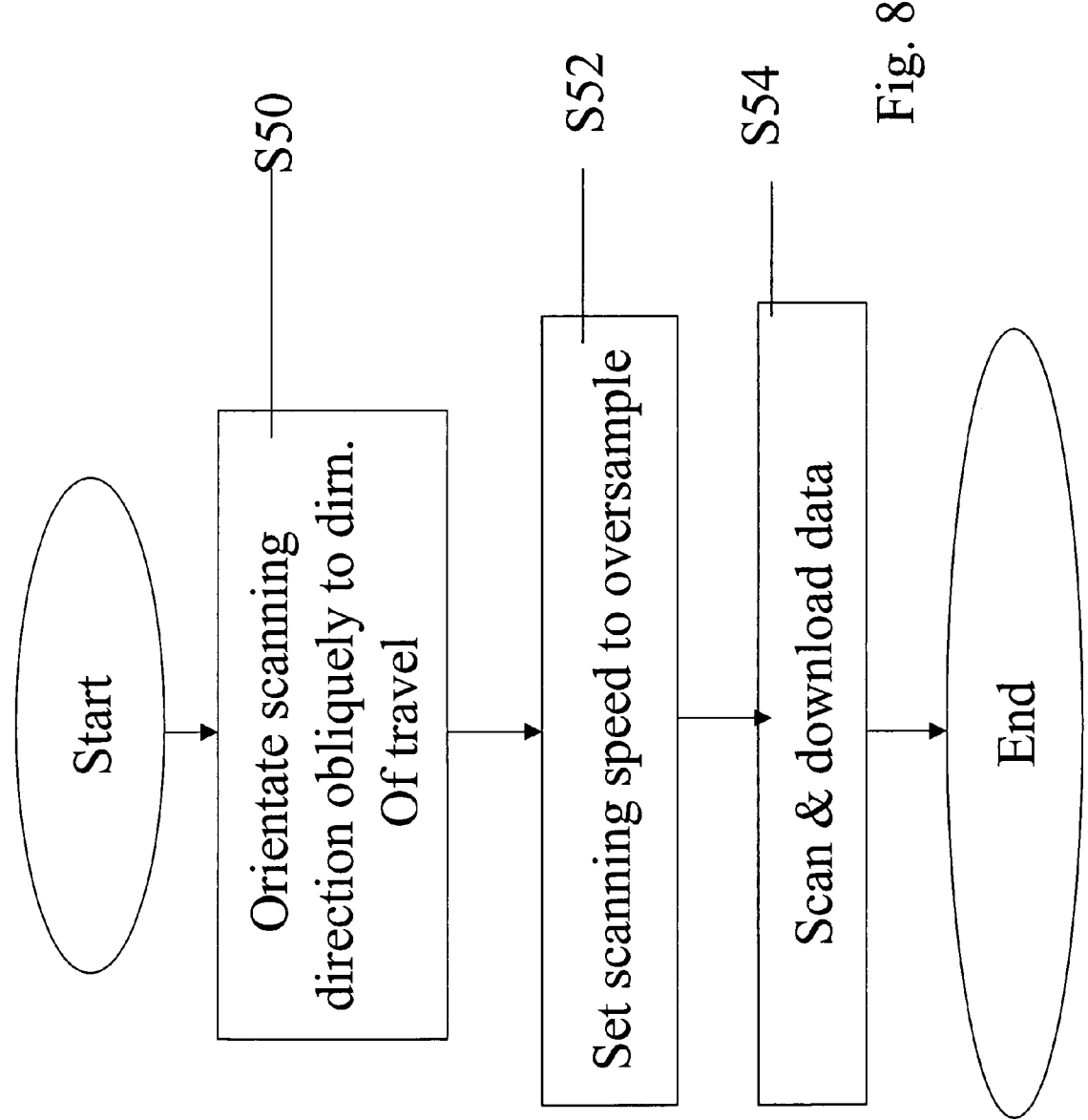
FIG. 8 is a simplified flow chart illustrating the control of a camera for hypersampling to improve resolution of the image capture.

As mentioned above, the camera can be used in a hypersampling mode in order to increase the resolution of the nadir image. Hypersampling involves orientating the direction of the pixel rows in the camera's image capture sensor to be at an oblique angle to the direction of travel, and requires appropriate image processing as described above. Likewise the speed at which the pixels are scanned to download the image from the sensor is preferably decoupled from the rate of travel. Reference is now made to FIG. 8, which is a simplified flow chart illustrating operation of direction control 12 and image taking control unit 14 to control operation of camera 10 for hypersampling. A stage S50 comprises orientating the scanning row direction to be at an oblique angle to the scanning direction of the target by the satellite. A second stage S52 involves setting the scanning speed to be decoupled from the relative motion, and specifically to sample faster than the scanner moves over the object so as to provide oversampling or hypersampling. Using the settings provided in stages S50 and S52, the scanning device is now enabled to carry out scanning in a stage S54 and to download data, in the form of raw pixels, obtained by the scanning.

Figure 9:
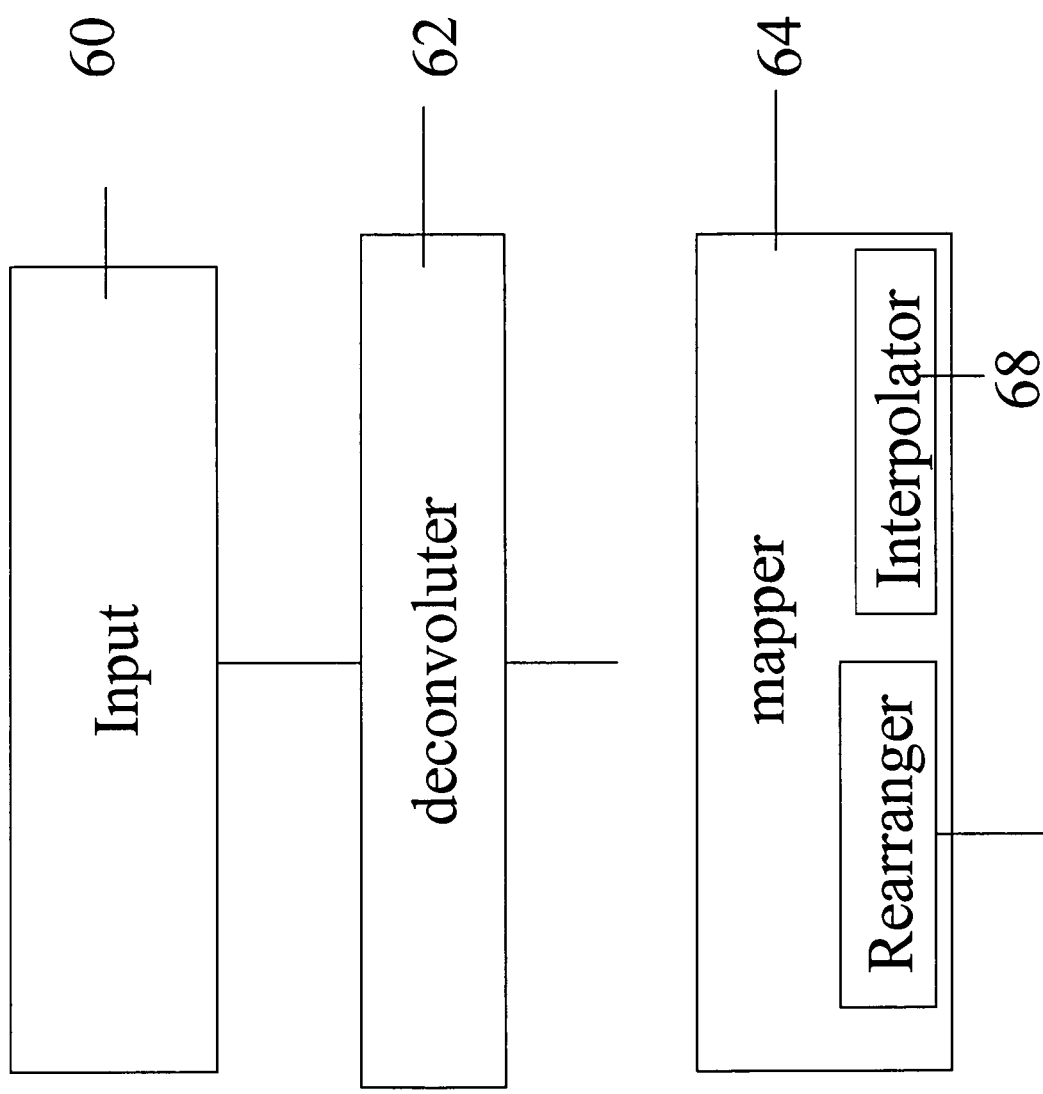
FIG. 9 is a simplified diagram of apparatus for carrying out hypersampling according to the procedure outlined in FIG. 8.

Reference is now made to FIG. 9 which is a simplified block diagram showing image processing apparatus for forming an image from the scan data provided by oblique angle oversampling as may typically result from controlling scanning as explained above. An input 60 receives the data. A deconvoluter 62 deconvolves the data to compensate for distortion or blurring in the optics of the scanner. Blurring, as found in optical systems, can be modeled as a convolution, and thus can be compensated for by processing using an opposite deconvolution.

Following the deconvoluter 62 is located a pixel mapper and interpolator 64. In regular scanning, sequentially obtained pixels belong next to each other in a final image. However, in oblique scanning this is no longer true and sequentially obtained pixels not only may not belong together but may not fit exactly onto a regular grid at all. Thus a separate task of mapping of pixels onto a final image is preferably carried out. The mapping may include interpolation in cases where the sampled raw pixels do not fitting exactly onto a grid or pixel position of the final image.

In one embodiment, the oblique angle has an integer tangent, thus 0 (zero) or 45 (forty five) degrees with a hypersampling factor which is great than or equal to 2. For an oblique angle of 45 degrees and hypersampling factor of 2 a pixel rearrangement feature involving mapping of the pixels from one grid to the other, may be used, while for all other hypersampling scanning angles, a pixel interpolation process is implemented. Typically, oblique angles having integer tangents are preferred as rearranging is easier than interpolation. Thus, tangents of one (oblique angle 45 degrees and hypersampling factor 2) or two (oblique angle 63.43 degrees and hypersampling factor 5) are typically used although higher integers work equally well. In such a case the sampled pixels generally fit exactly onto the pixel grid of the final image. In such a case, the mapper and interpolator 64 is required only to carry out pixel rearrangement and there is no need for interpolation as a separate process.

The theoretical principles of resolution enhancement of linear array imagery by deconvolution of optical and scanning effects are discussed in applicant's co-pending International Application No. PCT IL03/00354, corresponding to U.S. patent application Ser. No. 10/450,535, the contents of which are hereby incorporated by reference. In that disclosure, a result is first derived for conventional perpendicular scanning (Section 1.4 therein) and then for oblique scanning (Section 1.5 therein). The discussion on oblique scanning is followed by an algorithm for linear interpolation for even-symmetrical oversampling (Section 2 therein), which in turn is followed by an algorithm for rearrangement in the case of integral over-sampling factor scanning (Section 3 therein).

Applications

In the following, a non-limiting list of possible applications is given for uses of multiple imaging from a remote platform during a single pass over a target.

1) Improved Altitude (Elevation) Data

Figure 10:
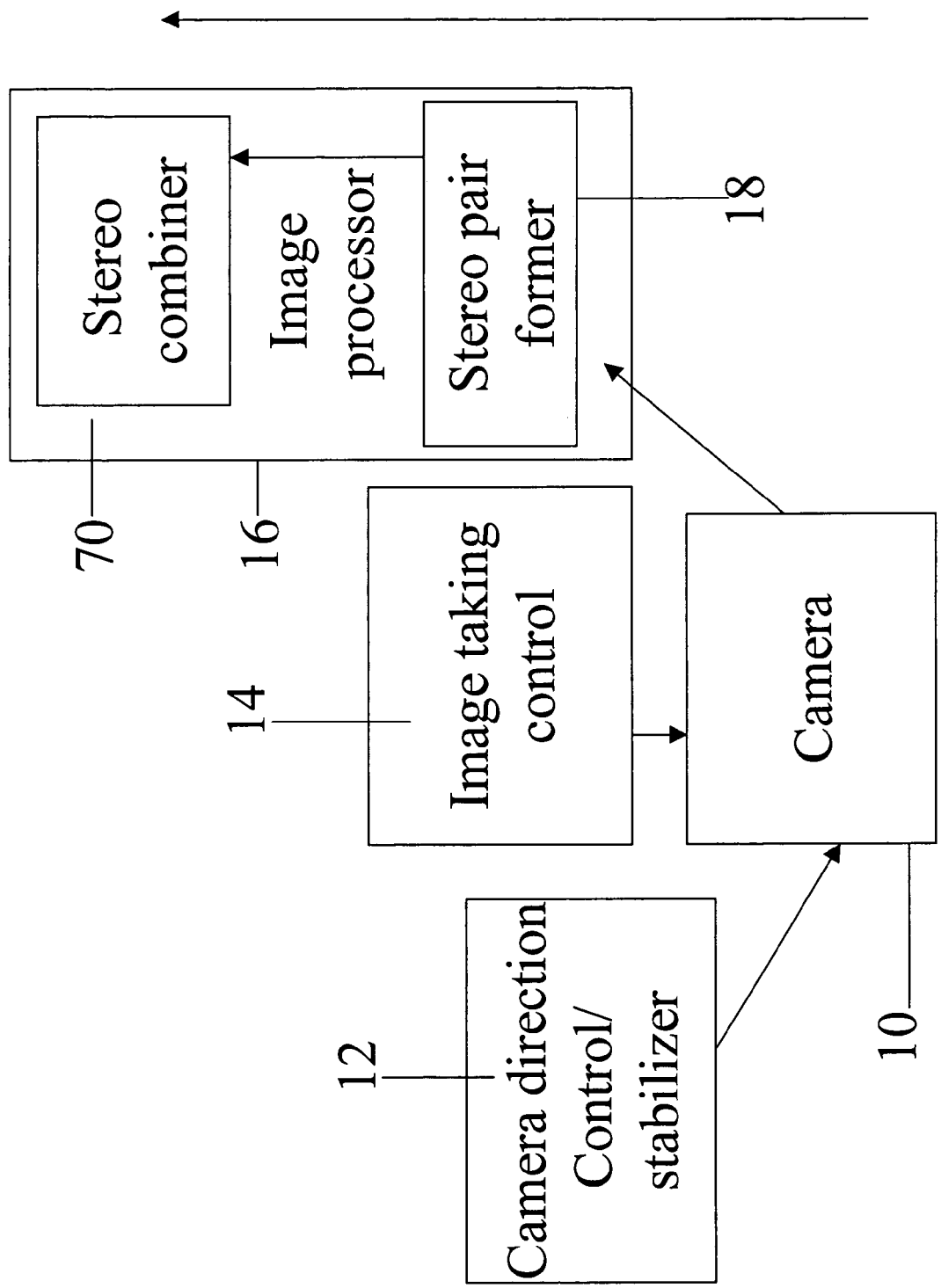
FIG. 10 is a simplified diagram illustrating the apparatus of FIG. 1, adapted for producing an overall result that combines altitude information from a plurality of stereo pairs.

More exact elevation data can be extracted from multiple images than from a single stereo pair. Conventionally it is possible to combine several stereo pairs taken at different passes. The present embodiments allow multiple stereo pairs from the same pass. Multiple imaging over a single pass gives additional advantages over conventional methods. For example, since the images are taken in close succession the relative accuracy, in knowledge of the platform's position between the different images, is very high. This in turn provides higher accuracy in the derived elevation data, than would be the case if the different stereo pairs derived from different passes. Taking of a series of images suitable for combining into two stereo pairs is shown in FIG. 4. Reference is now made to FIG. 10 which shows the apparatus of FIG. 1 adapted for the present application. The apparatus is the same as in FIG. 1 and parts that are the same as in previous figures are given the same reference numerals and are not referred to again except as necessary for understanding the present embodiment. Image processor 16 is configured with a stereo pair combiner 18 as in FIG. 2 which finds pairs of images and combines them into a stereo image. A further combiner 70 takes successive outputs of the stereo pair combiner 18 and combines them, using pixel mapping, into an overall image that uses all the altitude information in all of the available stereo pairs. The output thus has heightened altitude information.

2) Multiple Images—General Option

It is noted that, due to the small time difference (tens of seconds) between the images, the separate images of the location are almost the same. This is in contrast to separate images taken with larger time differences (days) in which the location and illumination conditions might have changed. It is thus possible in one embodiment of the present invention simply to take three or more images in the same pass and provide them unprocessed as output. The images are substantially the same, except for differing angles of elevation over the target and thus are suitable for use as input to various end-user applications. For example, a series of such multiple images may be compared to reveal rapid changes in the scene, for example movement of vehicles, boats, ocean waves, etc. The comparison is possible simply by comparing the same area in the separate images and may be carried out manually or using readily available image processing software.

3) Pixel Interpolation to Produce an Enhanced Resolution Grid

Figure 11:
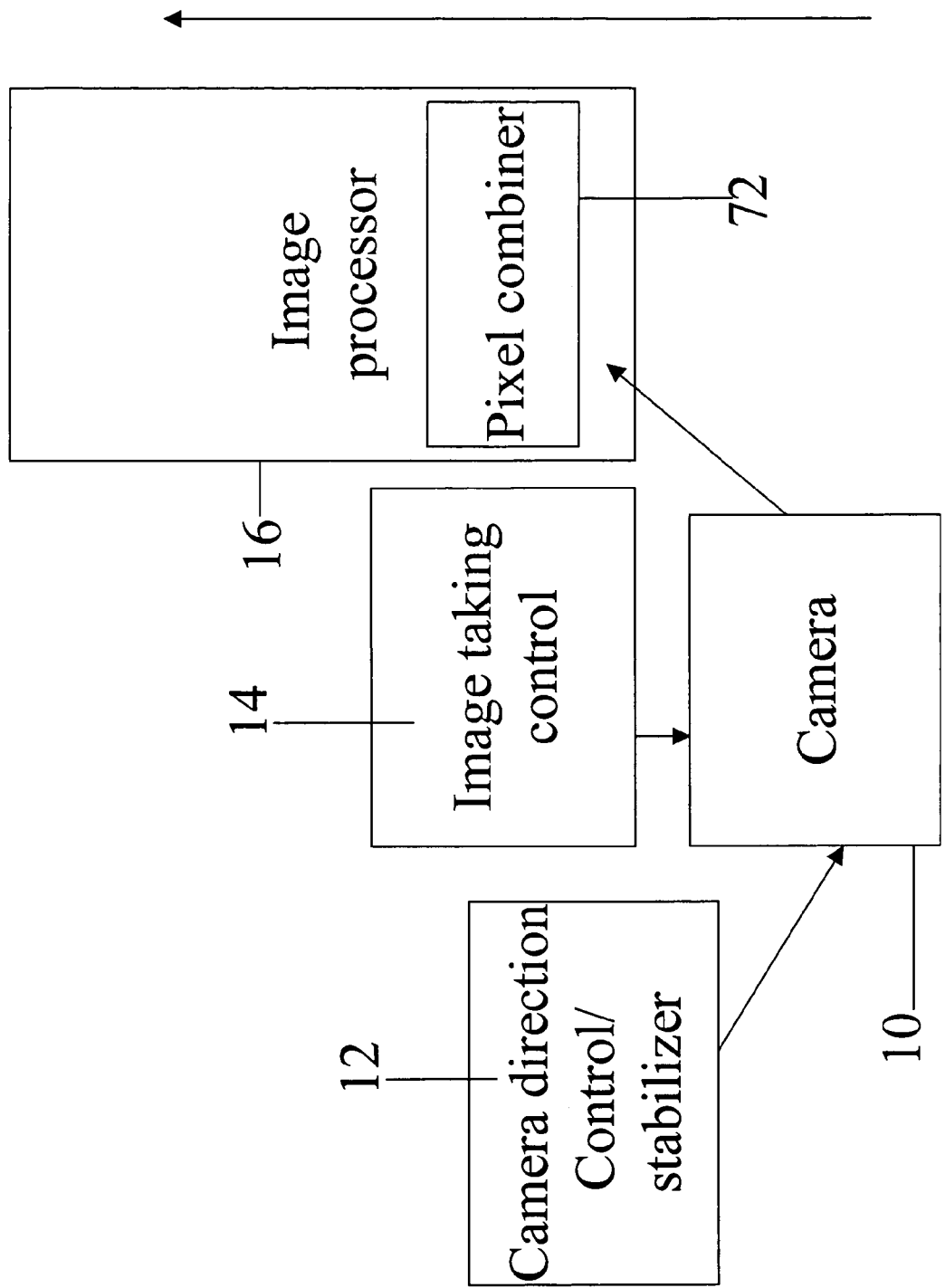
FIG. 11 is a simplified diagram illustrating the apparatus of FIG. 1, adapted to produce an overall result that combines pixels from a plurality of different images onto a single grid.

Reference is now made to FIG. 11, which is a simplified diagram illustrating a configuration of the apparatus of FIG. 1 for an application in which multiple images of the same location are obtained in a single pass and then pixels from each of the images are mapped onto a single overall pixel grid. Parts that are the same as in previous figures are given the same reference numerals and are not referred to again except as necessary for understanding the present embodiment. The image processor is configured with pixel combiner 72 which maps pixels from the different images onto a single grid. The result enhances the spatial resolution because pixels from several images form the single grid. It is noted that pixels may be mapped directly onto the grid, or interpolation techniques may be used to fill grid positions that are mapped from more than one pixel or to compensate for non-correspondence of the grid position with the pixel.

A technique for forming a grid from multiple images is in use in the current art in satellite and aerial photography, however, the images used of the same location are taken at significantly different times, that is on different approaches. The main problem in such techniques is that various changes take place between the different images. E.g., different lighting conditions, cloud coverage, landscape changes. Such changes make it difficult to produce a unified image with high spatial resolution. By contrast the present embodiments image the same location within a short period of time (tens of seconds). Thus changes are significantly reduced and it becomes much easier to produce a meaningful unified high-resolution image.

General

It is expected that during the life of this patent many relevant imaging devices and systems will be developed and the scopes of the terms herein, particularly of the terms "camera", "satellite", "imaging platform" and "imaging system", are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of controlling a remote imaging platform for image acquisition of an imaging target, the method comprising:
   controlling said platform to aim a camera at said target,
   controlling said platform to take at least a first, a second and a third images of said target during the course of a single pass of said platform over said target, whilst keeping said camera locked onto said target for a duration required to take said images.

2. The method of claim 1, further comprising combining the first, second and third images to form an overall imaging output of said target.

3. The method of claim 2, wherein said combining comprises pixelwise mapping between said images.

4. The method of claim 3, comprising forming an overall pixel grid comprising pixels from each of said images, thereby to form an overall output being of higher resolution than each of said images.

5. The method of claim 2, wherein said overall output comprises a comparison between said images to detect movement between said images.

6. The method of claim 2, wherein said controlling comprises taking at least four images of said target and said combining comprises forming at least two stereo images of said target.

7. The method of claim 6, wherein said combining further comprises combining at least two of said stereo images using pixelwise mapping, thereby to incorporate, into said overall output, altitude information from each of said at least two stereo images.

8. The method of claim 1, comprising angling said camera with respect to a direction of approach to said target prior to taking of any one of said images, thereby to increase resolution by hypersampling of said target.

9. The method of claim 1, wherein said controlling comprises:
   controlling said platform to take said first image prior to passing overhead,
   controlling said platform to take said second image whilst substantially at nadir with respect to said target, and
   controlling said platform to take said third image subsequently to passing overhead,
   the method further comprising:
   forming a stereo pair from said first and said third image to obtain topographical data of said target, and
   applying said topographical data from said stereo pair to said second image to obtain a nadir image with topographical data.

10. The method of claim 9, wherein said applying said topographical data from said stereo pair to said second image comprises applying a mapping between pixels of said stereo pair and pixels of said second image.

11. The method of claim 9, further comprising obtaining at least a first additional image prior to passing overhead, and at least a second additional image after passing overhead, and combining said additional images to form at least one additional stereo pair.

12. The method of claim 11, further comprising applying topographical data of said additional stereo pair to said second image already having topographical data of said first stereo pair.

13. The method of claim 9, comprising angling said camera with respect to a direction of approach to said target prior to taking of said second image, thereby to increase resolution of said second image by hypersampling of said target.

14. The method of claim 13, wherein said hypersampling comprises:
   receiving oblique angle oversampled scanned data, and
   rearranging said oblique angle oversampled scan data into regularly arranged pixels, thereby to form a regular image.

15. The image processing method of claim 14, wherein said oblique angle has a tangent of at least one.

16. The image processing method of claim 14, wherein said oblique angle is an angle having an integer tangent.

17. The image processing method of claim 16, wherein said rearranging comprises geometrically carrying out one-to-one mapping of sample pixels from said oblique overscanning, onto an image pixel grid representative of an actual geometry of a scanned object, thereby to form said regular image.

18. The image processing method of claim 14 wherein said rearranging further comprises interpolating between said oblique angle oversampled data to fill pixel positions of an image pixel grid representative of an actual geometry of a scanned object, said pixel positions being intermediate between sampled pixel positions, thereby to form an improved precision image.

19. The image processing method of claim 14, further comprising deconvoluting said oblique angle oversampled scanned data to compensate for optical distortion incurred in scanning.

20. The image processing method of claim 14 wherein said deconvoluting comprises compensating for distortions introduced by said oblique angle oversampling.

21. The image processing method of claim 14, wherein said deconvoluting comprises compensating for distortions introduced by said oblique angle oversampling and by optical distortion within said scanning.

22. The method of claim 9, wherein said platform is mounted on an orbiting satellite.

23. A method of controlling an orbital satellite for imaging, the satellite comprising a camera, the method comprising:

downloading to said satellite control software, said control software being operable with a selected imaging target to control said camera to:

aim at said target, obtain at least a first, a second and a third images of said target over the duration of a single pass, form an overall image output comprising data from said images.

24. The method of claim 23, wherein said forming an overall image comprises:

carrying out image processing to form at least a fourth image being a stereo pair combined from two of said images.

25. The method of claim 24, comprising forming at least a fifth image being a second stereo pair and combining said stereo pairs to form said overall output such that said overall output comprises altitude information from a plurality of stereo pairs.

26. The method of claim 23, wherein said forming an overall image comprises:

forming a fourth image, being a stereo pair, from said first and said third images, and mapping topographical data from said fourth image onto said second image to form a nadir image having topographical data.

27. Apparatus for photograph formation from multiple image capture, at a remote platform approaching and passing over a target, comprising:

camera direction controllability for training said camera on said target, image taking controllability for controlling said camera to image said target at least once upon approach to said target, at nadir and at least once after passing said target, image processing functionality for forming a stereo image by combining an image taken upon approach with an image taken after passing said target, thereby to obtain topographical data of said target, and additional image processing functionality for mapping said topographical data onto an image formed at said nadir, thereby to form a nadir image having topographical data.

28. Apparatus for photograph formation from multiple image capture, at a remote platform approaching and passing over a target, comprising:

camera direction controllability for training said camera on said target, image taking controllability for controlling said camera to image said target at least three times over a single pass over said target, at any requested one of approach to said target, at nadir and after passing said target, image processing functionality for combining said images into a single overall output.

29. Apparatus for photograph formation from multiple image capture, at a remote platform approaching and passing over a target, comprising:

camera direction controllability for training said camera on said target, image taking controllability for controlling said camera to image said target at least once upon approach to said target, at nadir and at least once after passing said target, image processing functionality for forming a stereo image by combining an image taken upon approach with an image taken after passing said target, thereby to obtain topographical data of said target, and additional image processing functionality for mapping said topographical data onto an image formed at said nadir, thereby to form a nadir image having topographical data.

* * * * *